United States Patent Office 3,719,700
Patented Mar. 6, 1973

3,719,700
BIS-PHOSPHORYLATED IMIDODITHIOCAR-
BONATES AND METHODS FOR THEIR
PREPARATION
Roger Williams Addor and David Edgar Ailman, Pennington, N.J., assignors to American Cyanamid Company, Stamford, Conn.
No Drawing. Continuation-in-part of application Ser. No. 640,836, May 24, 1967. This application July 27, 1970, Ser. No. 58,677
Int. Cl. C07c *155/08*
U.S. Cl. 260—455 P        6 Claims

ABSTRACT OF THE DISCLOSURE

Alkylene - bis-phosphinyldithiocarbamates represented by the structure:

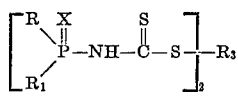

wherein R and $R_1$ are each members selected from the group consisting of lower alkyl, lower alkoxy and phenyl; X is sulfur and oxygen; and $R_3$ is a lower alkylene radical, such as ethylene, lower alkyl substituted ethylene, trimethylene, lower alkyl substituted trimethylene, oxydimethylene, tetramethylene and lower alkyl substituted tetramethylene. They find utility as insecticides and arachnicides and are highly effective against both the larval and adult stages of insects.

---

This application is a continuation-in-part of our copending application, Ser. No. 640,836, filed on May 24, 1967, now abandoned.

The present invention relates to novel bis-phosphorylated compounds and to methods for preparing the same. More particularly, the invention relates to alkylene-bis-phosphinyldithiocarbamates represents by the structure:

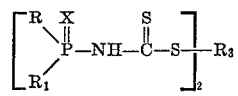

wherein R and $R_1$ are each members selected from the group consisting of lower alkyl, lower alkoxy and phenyl; X is sulfur and oxygen; and $R_3$ is a lower alkylene radical, such as ethylene, lower alkyl substituted ethylene, trimethylene, lower alkyl substituted trimethylene, oxydimethylene, tetramethylene and lower alkyl substituted tetramethylene.

The bis-N-phosphorylated compounds as hereinabove defined find utility as insecticides and arachnicides and are highly effective against both the larval and adult stages of insects, such as the mosquito, and may be used either as contact or systemic insecticides. Among the pests readily controlled with the compounds of the invention are the southern armyworm, bean aphid, two-spotted spider mite, large milkweed bug, German cockroach, southern corn rootworm and house fly.

In its broadest embodiment the compounds of the present invention are prepared by treating a phosphinyl isothiocyanate with a salt of an alkylene dithiol to form the alkylene - bis - phosphinyldithiocarbamates of the present invention. Alternatively, those compounds in which $R_3$ is oxydimethylene are prepared by the reaction of the respective isothiocyanate with an alkali metal hydrosulfide to form the corresponding dithiocarbamate salts. These salts are further reacted with bis-chloromethyl ether to form the oxydimethylene bis-phosphinyldithiocarbamates.

In general, the compounds of the present invention have the formula:

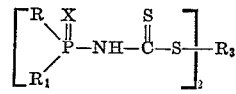

wherein R and $R_1$ are members selected from the group consisting of lower alkyl, lower alkoxy and phenyl; X is sulfur or oxygen and $R_3$ is ethylene, lower alkyl substituted ethylene, trimethylene, lower alkyl substituted trimethylene, oxydimethylene, tetramethylene or lower alkyl substituted tetramethylene.

Such compounds are prepared by reacting a phosphinyl isothiocyanate of the formula:

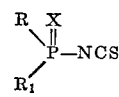

with the salt of an alkylene dithiol of the formula:

$$M-S-R_3-S-M$$

wherein M is an alkali metal, such as sodium potassium, or lithium, or a trialkylammonium group to form an alkylene-bis-phosphinyldithiocarbamate salt. Upon acidification the alkylene-bis-phosphinyldithiocarbamate thus-formed is recovered. Approximately two moles of the isocyanate reactant are used per mole of the alkylene dithiol. However, the molar ratio may be varied somewhat without seriously altering product yield. Advantageously, the reaction can be carried out over a wide range of temperatures, usually between about 0° C. and 100° C., but it is preferred to conduct the reaction at a temperature between about 30° C. and 60° C. Graphically, the over-all reaction may be illustrated as follows:

I

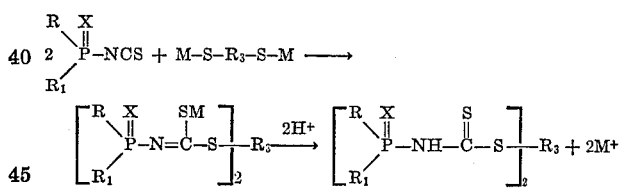

wherein R, $R_1$, $R_3$, X and M are as hereinabove defined.

Illustrative of the alkylene-bis-phosphinyldithiocarbamates so prepared are:

ethylene-bis-diethoxyphosphinyldithiocarbamate,
methylene-bis-dimethoxyphosphinyldithiocarbamate,
propylene-bis-diethylphosphinyldithiocarbamate,
tetramethylene-bis-dibutoxyphosphinyldithiocarbamate,
1,2-butylene-bis-ethoxyphenylphosphinyldithiocarbamate,
2,3-butylene-bis-diethoxyphosphinyldithiocarbamate,
2,2-dimethyltrimethylene-bis-methylphenylphosphinyldithiocarbamate,
ethylene-bis-diphenylphosphinyldithiocarbamate,
methylene–bis-diethoxyphosphinothioyldithiocarbamate,
propylene-bis-diethoxyphosphinothioyldithiocarbamate,
ethylene-bis-phosphinothioyldithiocarbamate.

An alternative method of preparing the compounds of the present invention is to treat the phosphinyl isothiocyanates of the formula:

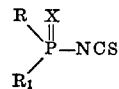

with an alkali metal hydrosulfide (MSH), yielding the corresponding phosphinyldithiocarbamate salt:

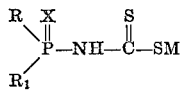

where R, $R_1$, and M are hereinabove defined. Where the latter salt is reacted with bis-chloromethyl ether and the reaction mixture acidified, there are formed oxydimethylene bis-phosphinyldithiocarbamates of the formula:

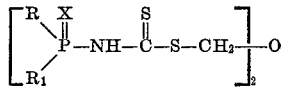

Illustrative of the oxydimethylene-bis-phosphinyldithiocarbamates so prepared are:

oxydimethylene-bis-diethoxyphosphinyldithiocarbamate,
oxydimethylene-bis-dimethoxyphosphinyldithiocarbamate,
oxydimethylene-bis-dimethylphosphinyldithiocarbamate,
oxydimethylene-bis-methoxyethylphosphinyldithiocarbamate,
oxydimethylene-bis-diphenylphosphinyldithiocarbamate.

The invention will be further illustrated in conjunction with the following examples which are to be taken as illustrative only and not by way of limitation. All parts are by weight unless otherwise stated.

EXAMPLE 1

Preparation of ethylene-bis-diethoxyphosphinyl-dithiocarbamate

The sodium salt of ethanedithiol is obtained as a colorless solid by adding the dithiol to excess sodium methoxide in ethanol under nitrogen followed by addition thereto of benzene. It is washed with ethanol-benzene and then with ether and dried in vacuo. To a cooled (room temperature) mixture of 8.5 parts of diethoxyphosphinyl-isothiocyanate in 100 parts (by volume) of benzene is added 3.0 parts of ethanedithiol sodium salt. After an hour, 10 parts (by volume) of the stirred mixture is removed and the very fine solids are spun down in the centrifuge and washed with 1 part of ether. The nuclear magnetic resonance spectrum in deuterium oxide shows a singlet at 6.80λ (—$CH_2$—S—, 4H) a multiplet at 5.9λ (—$CH_2$—O—, 8H), and a doublet at 8.68λ ($CH_3$—C, 12H).

The remainder of the reaction mixture is mixed with water and the phases are separated. The benzene phase is washed several times with water. The combined water fractions are filtered, washed once with ether, poured into a flask, ice-cooled, and acidified with 25% hydrochloric acid. The precipitated solids are washed several times with water and vacuum dried at 45° C.–50° C. over potassium hydroxide leaving 8.7 parts (84% based on workup of 90% of the intermediate salt) of pale yellow crystals, melting point 115° C.–118° C. Recrystallization by dissolving 5.0 parts in ethanol with slight warming followed by dilution with two volumes of hexane and cooling to −20° C. gives 3.4 parts of very fine pale yellow crystals, melting point 120° C.–125° C. at 1°/min. (dec.).

Analysis.—Calc'd for $C_{12}H_{26}N_2O_6P_2S_4$ (percent): C, 29.74; H, 5.29; N, 5.78; P, 12.79; S, 26.47. Found (percent): C, 30.14; H, 5.13; N, 5.75; P, 12.65 S, 26.66.

The infrared spectrum shows strong maxima at 1240, 1280, 1480, and 3080 cm.$^{-1}$, the latter two assignable to the

group. The nuclear magnetic resonance spectrum in deuterochloroform shows a doublet at 0.1λ (J=8 p.p.m., N—H, 2H), a singlet at 6.40λ (—S—$CH_2$—, 4H), a multiplet at 5.7λ (—$CH_2$—O—, 8H), and a triplet at 8.58λ (J=7 p.p.m., $CH_3$—C, 12H).

Utilizing the same procedure employed above to prepare ethylene bis-diethoxyphosphinyldithiocarbamate but with the indicated substitution of reactants, the following analogs are prepared.

(A) Preparation of trimethylene bis-diethoxyphosphinyldithiocarbamate.—By substituting propane-1,3-dithiol for ethanedithiol, melting point 89° C.–90° C.

Analysis.—Calc'd for $C_{13}H_{28}N_2O_6P_2S_4$ (percent): C, 31.31; H, 5.66; N, 5.62; P, 12.42; S, 25.72. Found (percent): C, 31.29; H, 5.84; N, 5.79; P, 12.24 S, 25.48.

(B) Preparation of propylene bis-diethoxyphosphinyldithiocarbamate.—By substitution propane-1,2-dithiol for ethanedithiol, melting point 114° C.–115° C.

Analysis.—Calc'd for $C_{13}H_{28}N_2O_6P_2S_4$ (percent): C, 31.31; H, 5.66; N, 5.62; P, 12.42; S, 25.72. Found (percent): C, 31.42; H, 5.80; N, 5.72; P, 12.64 S, 25.91.

(C) Preparation of ethylene bis-diethoxyphosphinothioyldithiocarbamate.—By substituting potassium diethoxyphosphinothioyldithiocarbamate, melting point 105° C.–110° C.

Analysis.—Calc'd for $C_{12}H_{26}N_2O_4P_2S_6$ (percent): C, 27.89; H, 5.07; N, 5.42; P, 11.99; S, 37.24. Found (percent): C, 28.00; H, 5.27; N, 5.60; P, 11.78 S, 37.20.

(D) Preparation of trimethylene-bis-diethylphosphinyldithiocarbamate.—By substituting diethylphosphinyl isothiocyanate for diethoxyphosphinyl isothiocyanate, and trimethylenedithiol sodium salt for ethanedithiod sodium salt, trimethylene-bis-diethylphosphinyldithiocarbamate was obtained in good yield.

(E) Preparation of 2,3-butylene-bis-ethoxyphenylphosphinothioyldithiocarbamate.—Substituting ethoxyphenylphosphinothioyl isothiocyanate for diethoxyphosphinyl isothiocyanate, and 2,3-butanedithiol sodium salt for ethanedithiol sodium salt resulted in the formation of 2,3-butylene - bis - ethoxyphenylphosphinothioyldithiocarbamate in good yield.

(F) Preparation of tetramethylene-bis-diphenylphosphinyldithiocarbamate.—By substituting diphenylphosphinyl isothiocyanate, for diethoxyphosphinyl isothiocyanate, and tetramethylenedithiol sodium salt for ethanedithiol sodium salt, tetramethylene-bis-diphenylphosphinyldithiocarbamate was obtained in good yield.

EXAMPLE 2

Preparation of oxydimethylene-bis-diethoxyphosphinyl dithiocarbamate

To an ice-cooled mixture of 0.9 part of bis-chloromethyl ether in 10 parts (by volume) of dry acetone is added 2.0 parts of potassium diethoxyphosphinyldithiocarbamate. After thirty minutes, the bath is removed and the mixture is stirred overnight. Filtration followed by concentration in vacuo gives 1.6 parts of yellow solids. The solids crystallize at room temperature from about 3:1 hexane-chloroform as pale yellow crystals, melting point 98.6° C.–99.6° C., 1.1 parts (58%).

Analysis.—Calc'd for $C_{12}H_{26}N_2O_7P_2S_4$ (percent): C, 28.79; H, 5.24; N, 5.60; P, 12.38; S, 25.62. Found (percent): C, 28.61; H, 5.30; N, 5.75; P, 12.12; S, 25.63.

The infrared spectrum shows bands at 1480 cm.$^{-1}$ and 3050 cm.$^{-1}$ attributable to the

group and at 1240 cm.$^{-1}$ for the P=O function.

Substituting potassium ethoxyphenylphosphinyldithiocarbamate for the potassium diethoxyphosphoryldithiocarbamate results in the formation of the compound oxydimethylene-bis-ethoxyphenylphosphinyldithiocarbamate.

Advantageously, the compounds may be employed for such pest control in liquid or solid formulations as sprays, dusts, dust concentrates, wettable powders, granular products, organic liquid formulations and emulsifiable concentrates. Solid formulations may be prepared by admixing the active materials with diluent carriers, such as talc, attapulgite, kaolin, diatomaceous earth, fuller's earth, and the like, with or without the addition of adjuvants, such as emulsifiers, surfactants, spreading and sticking agents. Liquid formulations, on the other hand, may be prepared by dissolving or dispersing the active material in water or in an organic solvent, generally with a small amount of emulsifier and then dispersing, dissolving, or diluting further the thus formed concentrate just prior to application. Diluents, such as water, and inexpensive organic solvents, such as fuel oils, deodorized kerosene, and the like, are conventional diluents frequently used for the above purpose.

In the example below, there is summarized outstanding insecticidal activity, attributed to the compounds of the invention.

EXAMPLE 3

Procedures for the determination of insecticidal activity southern armyworm (*Prodenia eridania* Cramer)

Compounds to be tested are made up as 0.1% and 0.01% solutions or suspensions in 65% acetone/35% water mixtures. Sieva lima bean leaves are dipped in the test solutions and set in a hood on a screen to dry. When dry, each leaf is placed in four-inch petri dishes which have a moist filter paper in the bottom, and ten third-instar armyworm larvae about ⅜ inch long are added to each dish. The dishes are covered and held at 80° F., and 60% R.H. After two days, mortality counts and estimates of the amount of feeding are made. The results are reported in Table I below.

Bean aphid (*Aphis fabae* Scopoli)

Compounds are tested as 0.1%, 0.01%, and 0.001% solutions or suspensions in 65% acetone/35% water mixtures. Two-inch fiber pots, each containing a nasturtium plant two inches high and infested with about 150 aphids two days earlier, are sprayed with test solution to give complete coverage of the aphids and the plants. The sprayed plants are laid on their sides on white enamel trays which have had the edges coated with No. 50 SAE oil as a barrier. Mortality estimates are made after holding for two days at 70° F., and 50% R.H. The results are reported in Table I below.

Two-spotted spider mite (*Tetranychus urticae* Koch)

Sieva lima bean plants with primary leaves three to four inches long are infested with about 100 adult mites per leaf four hours before use in this test. The mite and egg infested plants are dipped for three seconds in the 0.01% and 0.001% solutions used in the armyworm tests, and the plants set in the hood to dry. They are held for two days at 80° F., 60% R.H., and the adult mite mortality estimated on one leaf under a stereoscopic microscope. The other leaf is left on the plant an additional five days and then examined at 10X power to estimate the kill of eggs and of newly-hatched nymphs, giving a measure of ovicidal and residual action, respectively. The results are reported in Table I below.

Systemic tests

The compounds to be tested are formulated as emulsions containing 0.1 gram of test material, 0.2 gram of emulsifier, acetone, and water. This is diluted with sufficient water to give 100 p.p.m. and 10 p.p.m. emulsions. Sieva lima bean plants with only the primary leaves unfolded are cut off just above soil level and inserted into two-ounce bottles of test emulsions and held in place by a bit of cotton wrapped around the stem. The bottles are then placed in a ventilated box with the leaves extending outside the box, such that any possible fumes from the compounds will be drawn out the end of the box rather than rising to affect the test leaves. About fifty adult two-spotted spider mites are placed on each leaf. After holding three days at 80° F. and 60% R.H., mortality estimates are made and one leaf from each plant is placed on a moist filter paper in the bottom of a petri dish. Ten third-instar southern armyworm larvae are added to each dish and mortality counts are made after holding another three days at 80° F. and 60% R.H. The results are reported in Table I below.

Housefly (*Musca domestica* Linnaeus)

Groups of 25 adult female houseflies are lightly anesthetized with carbon dioxide, placed in wide-mouth pint mason jars, and covered with a screen cap. The test compound is formulated as an emulsion containing 50 p.p.m. or 5 p.p.m. of test material, an emulsifier, acetone and water. The mouth of the vial is covered with a single layer of cheesecloth, inverted and placed on the screen cap, so that the flies can feed on the solution through the screen. Mortality counts are made after two days at 80° F. The results are reported in Table I below.

Southern corn rootworm (*Diabrotica undecimpunctata howardi* Barber)

The compound is formulated as a dust and incorporated into the soil at the equivalent of 50 and 10 pounds per acre. The soil is sub-sampled into bottles, and ten 6- to 8-day old rootworm larvae added to each bottle, which is then capped. Mortality counts are made after six days at 80° F., 60% R.H. The results are reported in Table I below.

TABLE I

| Structure | Armyworm, percent | | Aphids, percent | | | Mites, percent | | Systemics, p.p.m. | | | | Housefly, p.p.m. | | Root worms, lbs./A. | |
|---|---|---|---|---|---|---|---|---|---|---|---|---|---|---|---|
| | | | | | | | | Mites | | A'worms | | | | | |
| | 0.1 | 0.01 | 0.1 | 0.01 | 0.001 | 0.01 | 0.001 | 100 | 10 | 100 | 10 | 50 | 5 | 50 | 10 |
| $[(C_2H_5O)_2\overset{O}{\underset{\|}{P}}-NH-\overset{S}{\underset{\|}{C}}-S-CH_2-]_2$ | 100 | 100 | 100 | 100 | 100 | 100 | 100 | 100 | 100 | 100 | 0 | 100 | 12 | 100 | 100 |
| $[(C_2H_5O)_2\overset{S}{\underset{\|}{P}}-NH-\overset{S}{\underset{\|}{C}}-S-CH_2-]_2$ | 100 | 0 | 100 | 100 | 20 | 0 | --- | 100 | 69 | 100 | 0 | 100 | 0 | 100 | 100 |
| $(C_2H_5O)_2\overset{O}{\underset{\|}{P}}-NH-\overset{S}{\underset{\|}{C}}-S-\overset{CH_3}{\underset{\|}{CH}}$ $(C_2H_5O)_2\overset{O}{\underset{\|}{P}}-NH-\overset{S}{\underset{\|}{C}}-S-CH_2$ | 100 | 100 | 100 | 100 | 100 | 100 | 56 | 100 | 100 | 100 | 100 | 100 | 0 | 65 | 0 |
| $[(C_2H_5O)_2\overset{O}{\underset{\|}{P}}-NH-\overset{S}{\underset{\|}{C}}-S-CH_2-]_2CH_2$ | 100 | 100 | 100 | 100 | 100 | 100 | 0 | 100 | 20 | 100 | 0 | 100 | 0 | 100 | 100 |
| $[(C_2H_5O)_2\overset{O}{\underset{\|}{P}}-NH-\overset{S}{\underset{\|}{C}}-S-CH_2-]_2O$ | 100 | 0 | 100 | 80 | 0 | 69 | 0 | 0 | --- | 0 | --- | 0 | --- | 100 | 90 |

We claim:
1. A compound of the formula:

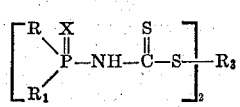

wherein R and $R_1$ are each loweralkoxy; X is sulfur or oxygen; and $R_3$ is ethylene, loweralkyl substituted ethylene, trimethylene, loweralkyl substituted trimethylene, tetramethylene, loweralkyl substituted tetramethylene or oxydimethylene.

2. The compound of claim 1: ethylene-bis-diethoxyphosphinyldithiocarbamate.
3. The compound of claim 1: trimethylene-bis-diethoxyphosphinyldithiocarbamate.
4. The compound of claim 1: propylene-bis-diethoxyphosphinyldithiocarbamate.
5. The compound of claim 1: oxydimethylene-bis-diethoxyphosphinyldithiocarbamate.
6. The compound of claim 1: ethylene-bis-diethoxyphosphinothioyldithiocarbamate.

References Cited

UNITED STATES PATENTS

| | | | |
|---|---|---|---|
| 3,519,709 | 7/1970 | Addor | 260—455 P |
| 3,136,801 | 6/1964 | Hopkins | 260—455 P |
| 1,835,050 | 12/1931 | Howland | 260—455 P |
| 3,126,406 | 3/1964 | Tilles et al. | 260—455 A |
| 3,344,170 | 9/1967 | Strycker | 424—300 |
| 2,987,541 | 6/1961 | Bissinger et al. | 424—300 |
| 3,309,266 | 3/1967 | Magee | 424—220 |
| 3,165,545 | 1/1965 | Blair | 424—220 |

OTHER REFERENCES

Reid, "Org. Chem. of Bivalent Sulfur" (1962), Chem. Pub. Co., New York, N.Y., vol. IV, pp. 202–03 (1962).
Reid, "Org. Chem. of Bivalent Sulfur" (1966), Chem. Pub. Co., New York, N.Y., vol. VI, p. 72 (1966).

LEWIS GOTTS, Primary Examiner
G. HOLLRAH, Assistant Examiner

U.S. Cl. X.R.
424—212, 215; 260—453 R, 513.5